A. BARR AND W. STROUD.
RANGE FINDER AND LIKE INSTRUMENT FOR USE ON SHIPBOARD.
APPLICATION FILED OCT. 13, 1921.
1,425,742.
Patented Aug. 15, 1922.
2 SHEETS—SHEET 1.
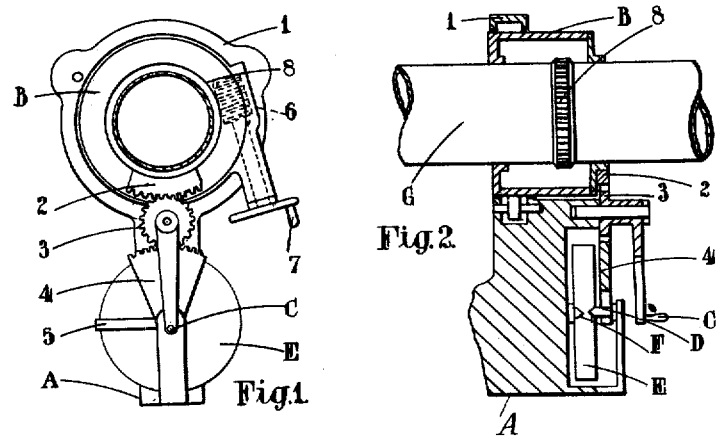
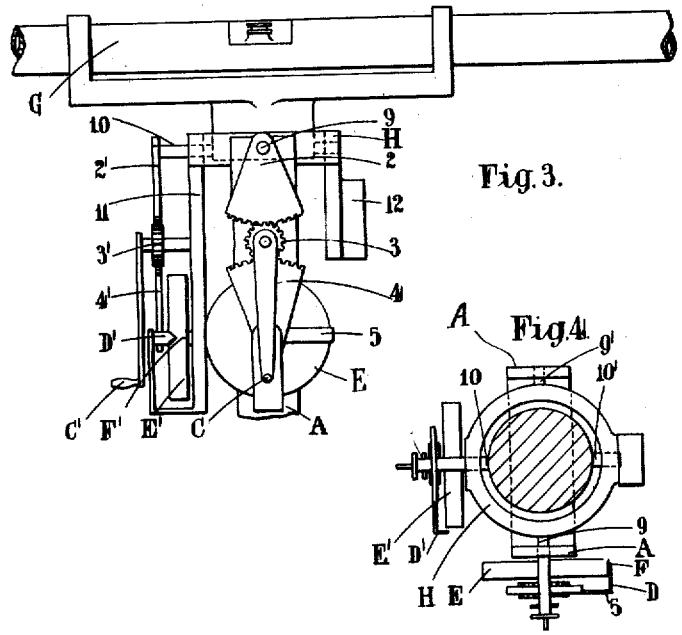
INVENTORS:
Archibald Barr
William Stroud.
By J. Walter Fowler
Attorney.

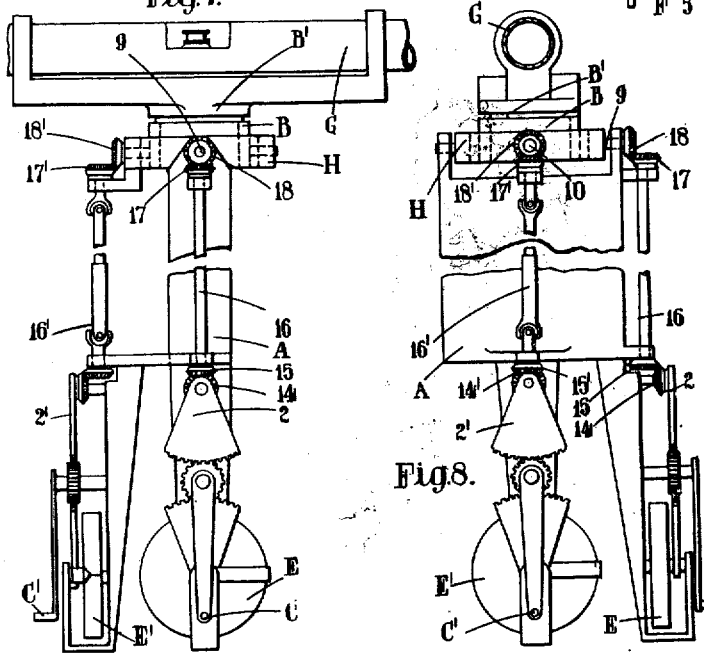

UNITED STATES PATENT OFFICE.

ARCHIBALD BARR AND WILLIAM STROUD, OF ANNIESLAND, GLASGOW, SCOTLAND, ASSIGNORS TO BARR AND STROUD, LIMITED, OF ANNIESLAND, GLASGOW, SCOTLAND.

RANGE FINDER AND LIKE INSTRUMENT FOR USE ON SHIPBOARD.

1,425,742.

Specification of Letters Patent. Patented Aug. 15, 1922.

Application filed October 13, 1921. Serial No. 507,473.

*To all whom it may concern:*

Be it known that we, ARCHIBALD BARR and WILLIAM STROUD, subjects of the King of Great Britain and Ireland, and both of Caxton Street, Anniesland, Glasgow, Scotland, have invented new and useful Improvements in Range Finders and like Instruments for Use on Shipboard, of which the following is a specification.

This invention refers to supports in which provision is made for maintaining a line or surface of the support horizontal or approximately so, for use on moving structures, for example, for supporting instruments on shipboard, such as observational instruments, for example, height-finders in which the range of a target is measured and its height ascertained by multiplying the range by the sine of the altitude of the target above the horizon.

Under conditions where divergence from the horizontal occurs about one axis only, such, for example, as when a target is exactly on the beam and the ship is rolling only, a support according to this invention need only comprise means for imparting counter-motions to the support by angular adjustments equal and opposite to angles through which the deck of the ship (assumed to be plane) inclines from the horizontal position, but in order to maintain horizontality under conditions where divergence from the horizontal occurs about two axes, such as is due to pitching and rolling, the support, in order to be completely effective, may require to comprise means for imparting counter-motions by angular adjustments about two horizontal axes, say, at right angles to one another.

A support according to this invention comprises a stand which partakes of the movements to be counteracted, a carrier on the stand capable of angular adjustment about a horizontal axis or about two horizontal axes divergent to one another, say, at right angles, a horizontality indicator for indicating the horizontal appertaining to the one horizontal axis or two horizontality indicators for indicating the horizontal axes, hand actuated mechanism for imparting counter-motions to the carrier about the one horizontal axis, or two hand actuated mechanisms for imparting counter-motions about the two horizontal axes, so as to bring the carrier into conformity with the horizontality indicator or both of them.

In one type of construction the horizontality indicator or each of them may comprise an index mark or its equivalent, and the hand actuated mechanism or each of them may comprise a pointer or its equivalent to be maintained coincident with the index mark on its associated horizontality indicator, a handle, a connection between the handle and the pointer and a connection between the handle and the carrier, such that in the process of keeping the pointer and index mark in coincidence the required counter-motions are imparted to the carrier, on which the instrument to be used is supported.

Any suitable type of horizontality indicator may be used such, for example, as those of the long period damped pendulum, or of the vertical axis gyroscope types.

In some cases the horizontality indicator or both of them may be arranged to turn azimuthally with the carrier. In other cases the horizontality indicator or both of them may be arranged to turn with the ship, for example, when two indicators are provided, one may be arranged to deal with the rolling and another with the pitching of the ship. Thus, the stand may carry a gymbal ring arrangement from which the instrument is supported and about which it is capable of azimuthal adjustment and one horizontality indicator appertaining to roll and associated hand actuated mechanism may be used in respect of counter-motions to be imparted to one element of the gymbal arrangement about its axis, and another indicator appertaining to pitch and associated hand actuated mechanism may be used in respect of counter-motions to be imparted to the other element of the gymbal arrangement about its axis, which axes are normal to one another.

Some examples of construction according to this invention will now be described with reference to the accompanying drawings, in which:—

Figure 1 is a sectional end view and Figure 2 is a sectional side view of a support for dealing with motions about one horizontal axis.

Figure 3 is a front elevation and Figure 4 is a plan partly in section of a support for dealing with motions about two horizontal axes at right angles to one another.

Figures 5 and 6 are views analogous to Figures 3 and 4 respectively and show a modification.

Figure 7 is a front view and Figure 8 is a side view each with portions broken away of a further modification.

In Figures 1 and 2, which illustrate a support for dealing with, say, roll only, A designates the stand which is capable of rotation about an axis perpendicular to the deck of the ship for azimuthal adjustment, and is formed with a head 1 in which a ring B, which constitutes the carrier, is mounted capable of angular adjustment about its axis, a diametrical line of which is required to be maintained horizontal.

Fixed to the ring B is a toothed sector 2, with which gears a pinion 3 carreid by and connected to turn with the shaft of a handle C. The pinion 3 also gears with a toothed sector 4, of the same pitch diameter as the sector 2. The sector 4 is provided with an arm 5 having at its end a pointer D. Mounted on the stand A is a horizontality-indicator E, comprising an index mark F. The indicator E is intended to represent an indicator of the Mallock type. In the process of operation it is the duty of a person to so turn the handle C as to keep the pointer D opposite the index mark F, with the result that a horizontal diametrical line on the support B is thereby maintained horizontal notwithstanding the rolling of the ship. In this construction a rangefinder G is represented as being supported in the carrier B, which for heightfinding is required to be rotated about its longitudinal axis. For this purpose the ring B is formed with a bearing to carry the shaft of a worm 6 operated by a handle 7, and the rangefinder is provided with a worm wheel 8 with which the worm 6 gears.

Figures 3 and 4 illustrate a support for dealing with rolling and pitching. In this construction the stand A, which is mounted on the ship as in Figures 1 and 2, is forked at its head, and carries a ring H by means of pivots 9 $9^1$, the pivot 9 being rigidly fixed to the ring H. Supported from the ring H by means of pivots 10 $10^1$ is the carrier B which in this case is provided with bearings to receive the instrument G. The pivot 10 is rigidly fixed to the carrier B. To one side of the ring H is rigidly fixed a depending frame 11 and to the opposite side is rigidly fixed a weight 12 to counter-balance the load. In this case a sector 2 is fixed to and turns with the pivot 9 and mechanism comprising parts 3, C, 4, 5, D, E and F, as in Figures 1 and 2, are mounted on the stand A, and corresponding mechanism comprising parts $3^1$, $C^1$, $4^1$, $5^1$, $D^1$, $E^1$ and $F^1$ are mounted on the frame 11, and a sector $2^1$ is fixed to and turns with the pivot 10. Thus if one person operates handle C so as to keep the pointer D opposite the index mark F and a second person operates the handle $C^1$ so as to keep the pointer $D^1$ opposite the index mark $F^1$, the carrier B will be maintained horizontal or approximately so.

The construction illustrated at Figures 5 and 6 is a modification of that shown at Figures 3 and 4 in that the parts $3^1$, $C^1$, $4^1$, $5^1$, $D^1$, $E^1$ and $F^1$ are mounted on the stand A, instead of on the frame 11 and the sector $2^1$ is connected with the pivot 10 by a telescopic shaft 13 having two universal joint couplings.

Figures 7 and 8 illustrate a construction in which the axes of the horizontality indicators E $E^1$ are fixed relatively to the ship and show an arrangement whereby the indicators and the hand operated mechanisms may be located at lower level, say, beneath the deck of the ship. The mechanism provided in this case corresponds generally with that described with reference to Figures 5 and 6, but as the stand A and carrier B are not capable of rotation about an axis perpendicular to the deck, a head $B^1$ is provided in which the instrument is mounted and is arranged to rotate about the vertical axis of the carrier B, and a connection between the axle of the sector 2 and pivot 9 is made by bevel gears 14, 15, shaft 16 and bevel gears 17, 18, and the connection between the axle of the sector $2^1$ and pivot 10 is made by bevel gears $14^1$, $15^1$, telescopic shaft $16^1$ having two universal joint couplings one at each end, and bevel gears $17^1$, $18^1$.

In the arrangements illustrated at Figures 1, 2, Figures 3, 4, and Figures 5, 6, seats may be provided for the operators on the stand A.

It will be recognized that instead of a mark on the horizontality indicator and a pointer which can be brought into conformity therewith, other mechanical or optical devices or means may be used to indicate conformity. Further, the mechanism shown comprising two equal toothed sectors and an intermediate pinion attached to a handle is only by way of illustration, other means for imparting the required motions may be adopted.

We claim:—

1. A support comprising a stand, a carrier on the stand capable of angular adjustment about a horizontal axis, a horizontality indicator for indicating the horizontal appertaining to the said horizontal axis, and hand actuated mechanism for imparting counter-motions to the carrier about the horizontal axis so as to bring the carrier into conformity with the horizontality indicator, for the purposes set forth.

2. A support comprising a stand, a carrier on the stand capable of angular adjustment about two horizontal axes divergent to one another, two horizontality indicators for indicating the horizontal appertaining to the two horizontal axes, and two hand actuated mechanisms for imparting counter-motions about the two horizontal axes so as to bring the carrier into conformity with the horizontality indicators, for the purposes set forth.

3. A support comprising a stand capable of rotation about an axis perpendicular to the structure on which it is mounted, a carrier on the stand capable of angular adjustment about a horizontal axis, a horizontality indicator for indicating the horizontal, appertaining to the said horizontal axis, and hand actuated mechanism for imparting counter-motions to the carrier about the horizontal axis so as to bring the carrier into conformity with the horizontality indicator, for the purposes set forth.

4. A support comprising a stand capable of rotation about an axis perpendicular to the structure on which it is mounted, a carrier on the stand capable of angular adjustment about two horizontal axes divergent to one another, two horizontality indicators for indicating the horizontal appertaining to the two horizontal axes, and two hand actuated mechanisms for imparting counter-motions about the two horizontal axes so as to bring the carrier into conformity with the horizontality indicators, for the purposes set forth.

5. A support comprising a stand, a carrier mounted on the stand capable of angular adjustment about a horizontal axis, a horizontality indicator for indicating the horizontal appertaining to the said horizontal axis, an index mark on said indicator, hand actuated mechanism for imparting counter-motions to the carrier about the horizontal axis, the hand actuated mechanism comprising a pointer to be maintained coincident with the said index mark, a handle, a connection between the handle and the pointer and a connection between the handle and the carrier, such that in the process of keeping the pointer and index mark in coincidence the required counter-motions are imparted to the carrier, for the purposes set forth.

6. A support comprising a stand, a carrier mounted on the stand capable of angular adjustment about two horizontal axes divergent to one another, two horizontality indicators for indicating the horizontal appertaining to the two horizontal axes, two index marks one on each horizontality indicator, two hand actuated mechanisms for imparting counter-motions about the two horizontal axes, each hand actuated mechanism comprising a pointer to be maintained coincident with the index mark on its associated horizontality indicator, a handle, a connection between the handle and the pointer and a connection between the handle and the carrier, such that in the process of keeping the pointer and index mark in coincidence the required counter-motions are imparted to the carrier, for the purposes set forth.

7. A support comprising a stand capable of rotation about an axis perpendicular to the structure on which it is mounted, a carrier mounted on the stand capable of angular adjustment about a horizontal axis, a horizontality indicator for indicating the horizontal appertaining to the said horizontal axis, an index mark on said indicator, hand actuated mechanism for imparting counter-motions to the carrier about the said horizontal axis comprising a pointer to be maintained coincident with the said index mark, a handle, a connection between the handle and the pointer and a connection between the handle and the carrier, such that in the process of keeping the pointer and index mark in coincidence the required counter-motions are imparted to the carrier, for the purposes set forth.

8. A support comprising a stand capable of rotation about an axis perpendicular to the structure on which it is mounted, a carrier mounted on the stand capable of angular adjustment about two horizontal axes divergent to one another, two horizontality indicators for indicating the horizontal appertaining to the two horizontal axes, two index marks one on each horizontality indicator, two hand actuated mechanisms for imparting counter-motions about the two horizontal axes, each hand actuated mechanism comprising a pointer to be maintained coincident with the index mark on its associated horizontality indicator, a handle, a connection between the handle and the pointer and a connection between the handle and the carrier, such that in the process of keeping the pointer and index mark in coincidence the required counter-motions are imparted to the carrier, for the purposes set forth.

9. A support comprising a stand, a carrier mounted on the stand capable of angular adjustment about a horizontal axis, a horizontality indicator for indicating the horizontal appertaining to the said horizontal axis, an index mark on said indicator, hand actuated mechanism for imparting counter-motions to the carrier about the said horizontal axis, the hand actuated mechanism comprising a pointer to be maintained coincident with the index mark, a handle, two toothed sectors and a pinion, for the purposes set forth.

10. A support comprising a stand, a carrier mounted on the stand capable of angular adjustment about two horizontal axes divergent to one another, two horizontality indicators for indicating the horizontal appertaining to the two horizontal axes, two index marks one for each horizontality indicator, two hand actuated mechanisms for imparting counter-motions about the two horizontal axes, each hand actuated mechanism comprising a pointer to be maintained coincident with the index mark on its associated horizontality indicator, a handle, two toothed sectors and a pinion, for the purposes set forth.

11. A support comprising a stand capable of rotation about an axis perpendicular to the structure on which it is mounted, a carrier mounted on the stand capable of angular adjustment about a horizontal axis, a horizontality indicator for indicating the horizontal appertaining to the said horizontal axis, an index mark on said indicator, hand actuated mechanism for imparting counter-motions to the carrier about the said horizontal axis comprising a pointer to be maintained coincident with the said index mark, a handle, two toothed sectors and a pinion, for the purposes set forth.

12. A support comprising a stand capable of rotation about an axis perpendicular to the structure on which it is mounted, a carrier mounted on the stand capable of angular adjustment about two horizontal axes divergent to one another, two horizontality indicators for indicating the horizontal appertaining to the two horizontal axes, two index marks one on each horizontality indicator, two hand actuated mechanisms for imparting counter-motions about the two horizontal axes, each hand actuated mechanism comprising a pointer to be maintained coincident with the index mark on its associated horizontality indicator, a handle, two toothed sectors and a pinion, for the purposes set forth.

ARCHIBALD BARR.
WILLIAM STROUD.